(12) United States Patent
Blanc et al.

(10) Patent No.: US 7,272,778 B2
(45) Date of Patent: Sep. 18, 2007

(54) METHOD AND SYSTEMS FOR IMPROVING TEST OF DATA TRANSMISSION IN MULTI-CHANNEL SYSTEMS

(75) Inventors: Alain Blanc, Tourrelles-sur-Loup (FR); Bruno Mesnet, Gallieres (FR); Rene Gallezot, La Colle-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 10/656,472

(22) Filed: Sep. 5, 2003

(65) Prior Publication Data

US 2004/0071091 A1    Apr. 15, 2004

(30) Foreign Application Priority Data

Sep. 27, 2002    (EP) ................................. 02368104

(51) Int. Cl.
*H03M 13/03*    (2006.01)
(52) U.S. Cl. .................................... 714/781
(58) Field of Classification Search ................. 398/14, 398/34, 68; 370/241, 242; 714/801, 784
See application file for complete search history.

(56) References Cited

U.S. PATENT DOCUMENTS 6,771,655 B1* 8/2004 O'Loughlin et al. ........ 370/449
2002/0053062 A1* 5/2002 Szymanski .................. 714/801
2003/0163555 A1* 8/2003 Battou et al. ............... 709/223
2005/0251846 A1* 11/2005 Dravida et al. ............. 725/129

* cited by examiner

*Primary Examiner*—Guy Lamarre
*Assistant Examiner*—Sam Rizk
(74) *Attorney, Agent, or Firm*—Daniel E. McConnell; Joscelyn G. Cockburn

(57) ABSTRACT

A method and systems to test a communication system (200) comprising a plurality of emitters (205), receivers (210) and channels (220) are disclosed. According to the method of the invention the data used for the test are preprocessed so as to be analyzed on the fly by the receivers during the test. In a preferred embodiment, a connection identifier value characterizing emitter and receiver addresses as well as data properties, if any, is associated to each data and CRC bits are computed to format frames comprising data, connection identifier value and CRC bits (410). During the test, the communication system transmits frames from emitters to corresponding receivers. Upon frames reception, receivers extract data (455), connection identifier value (460) and CRC bits (465) and compute CRC bits on received data (470). The comparison (475) of transmitted and computed CRC bits in receiver allows determining whether or not frames have been well transmitted.

6 Claims, 4 Drawing Sheets

METHOD AND SYSTEMS FOR IMPROVING TEST OF DATA TRANSMISSION IN MULTI-CHANNEL SYSTEMS

FIELD OF THE INVENTION

The present invention relates to the test of communication systems and more specifically to the test of communication systems comprising a plurality of emitters and receivers and a plurality of channels between each couple of emitter and receiver.

BACKGROUND OF THE INVENTION

The rate at which data are transmitted through communication networks has dramatically increased in recent years. Fueled by progresses achieved in fiber and optoelectronic devices and techniques such as DWDM (Dense Wavelength Division Multiplexing), which allow multiplying the bandwidth of a single fiber by merging many wavelengths on it, telecommunications and networking industry had to develop devices capable of routing and switching the resulting huge amount of data that converge and must be dispatched at each network node. Typically, routers and switches situated at those network nodes have to cope with the requirement of having to move data at aggregate rates that must be expressed in hundredths of giga ($10^9$) bits per second while multi tera ($10^{12}$) bits per second rates must be considered for the new devices under development.

If considerable progress have been made in optoelectronic, which allowed reaching this level of performances in the transport of data from node to node, it remains that switching and routing of the data is still done in the electrical domain at each network node. This, essentially, because there is no optical memory available yet that would permit storing temporarily the frames of transmitted data while they are examined to determine their final destination. This must still be done in the electrical domain using the traditional semiconductor technologies and memories.

Improvements in semiconductor processes are enabling the making of integrated circuits of increasing size and complexity. Combined with the complexity of the multi-channels, multi-emitters and receivers capabilities requested in communication systems, whole electronic communication systems represent an environment that must be tested for reliability reasons and also to determine their performances. As a consequence, adapted methods have been developed for testing the behavior of such systems.

A well known solution consists in sending a flow of data from an emitter to a receiver and changing the active channel through which data is transmitted as illustrated on FIG. 1. In this example, communication system 100 comprises an emitter 105, a receiver 110 and a set 115 of n possible channels referred to as 120-1 to 120-n. Testing communication system 100 according to this method consists in sending a first flow of data from emitter 105 to receiver 110 through channel 1, then sending a second flow of data from emitter 105 to receiver 110 through channel 2 and so on until all the channels have been used. The following test that is done consists in sending a flow of data from emitter 105 to receiver 110 through any channel and commuting to another channel during the transmission. Generally, the data that are used to test the system, i.e. the data sent from emitter 105, are stored in a first file and data received at receiver 110 are stored in a second file. At the end of the test, both files are compared to check that data has not been altered, lost, duplicated nor desequenced.

However, due to the complexity reached by such system, the amount of data used during the communication system test requires huge files and the analysis, generally conducted when the test is completed, takes time. Furthermore, since the analysis is generally done at the end of the test, information relative to the environment state when an error has occurred may be lost. Finally, the communication system being tested by analyzing the behavior of couple of emitter/receiver one after the other, it is not tested in real conditions wherein several channels may be used simultaneously to transmit data from different emitters to different receivers.

SUMMARY OF THE INVENTION

Thus, it is a broad object of the invention to remedy the shortcomings of the prior art as described here above.

It is another object of the invention to provide a method adapted to test communication systems comprising a plurality of emitters, receivers and channels and detect automatically any kind of errors.

It is a further object of the invention to provide a method adapted to test communication systems comprising a plurality of emitters, receivers and channels and detect automatically any kind of errors in real time.

The accomplishment of these and other related objects is achieved by a method to test a communication system comprising a plurality of emitters, receivers and channels, with a set of data, each data comprising at least one emitter and one receiver identifiers, said method comprising the steps of:

for each data of said set of data:
  assigning a connection identifier value to said data according to the emitter and receiver identifiers of said data;
  computing CRC bits on said data;
  associating said computed CRC bits and said connection identifier value to said data;
transmitting said data, said computed CRC bits and said connection identifier value to said communication system;
processing said transmitted data, computed CRC bits and connection identifier value in said communication system to pass on said data, said computed CRC bits and said connection identifier value to corresponding receiver;
extracting data, CRC bits and connection identifier value;
computing CRC bits on said extracted data; and,
comparing said extracted CRC bits and said CRC bits computed on said extracted data, wherein a transmission error is detected if said extracted CRC bits and said CRC bits computed on said extracted data are different.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 3 comprising

FIG. 4, comprising

DETAILED DESCRIPTION OF THE PREFERRED EMBODIMENT

The basic principle of the invention consists in adapting the data used for testing the communication system so that the receivers may analyze this data to check its behavior. For sake of clarity, the detail description is based on unicast message however, handling multicast message does not change the method of the invention.

Figure 1:
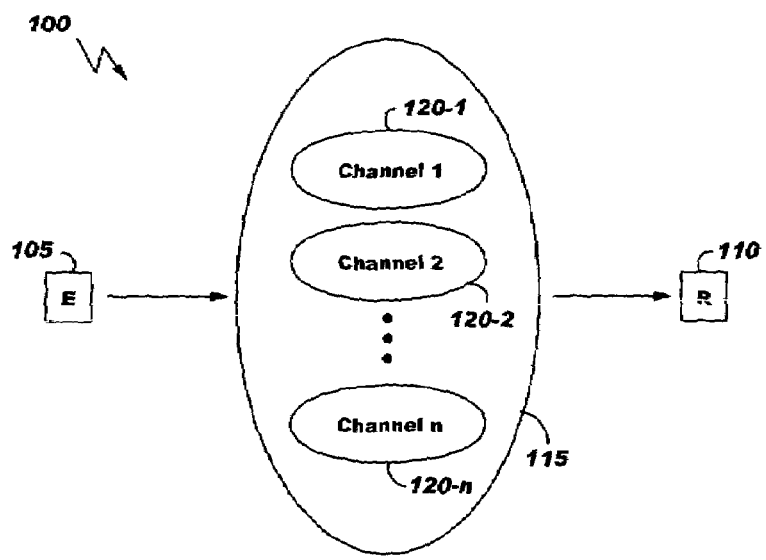
FIG. 1 illustrates a standard method used to test communication system having an emitter, a receiver and a plurality of channels.
Figure 2:
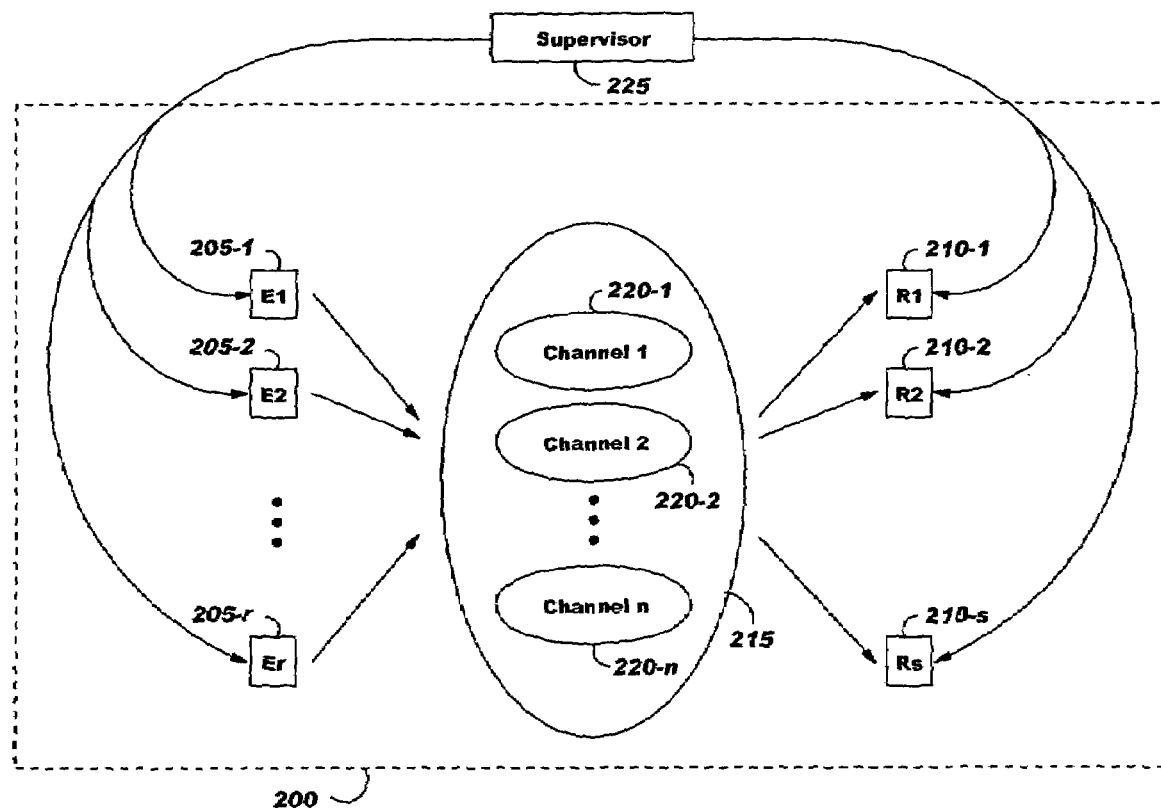
FIG. 2 depicts the communication system to be tested and the principle of the method of the invention.

FIG. 2 illustrates a whole communication system 200 to be tested. Communication system 200 comprises a plurality of emitters 205-1 to 205-r, a plurality of receivers 210-1 to 210-s and a set 215 of channels 220-1 to 220-n adapted to transfer data from any emitter 205-1 to 205-r to any receiver 210-1 to 210-s. One principle of the method of the invention includes transmitting data using all the emitters, receivers and channels and comparing on the fly the data of the receivers with the one of the emitters. To that end, each data used for testing the communication system 200 comprises a connection identifier, generically referred herein below to as CId, that consists of emitter and receiver Identifications and, if needed, transmission properties. Transmission properties may contain any property that may modify what has been transmitted, e.g. data priority. For example, connection identifier CId(i) contains the identifier of an emitter E(i), the identifier of a receiver R(i) and a set of properties P(i). Connection identifier CId(i) may be noted as follow:

$$CId(i)=(E(i), R(i), P(i)) \quad (1)$$

Connection identifier is determined according to the data and the addresses associated thereto. A value VCId(i) is assigned to each connection identifier CId(i) by using a reference table.

Figure 3A:
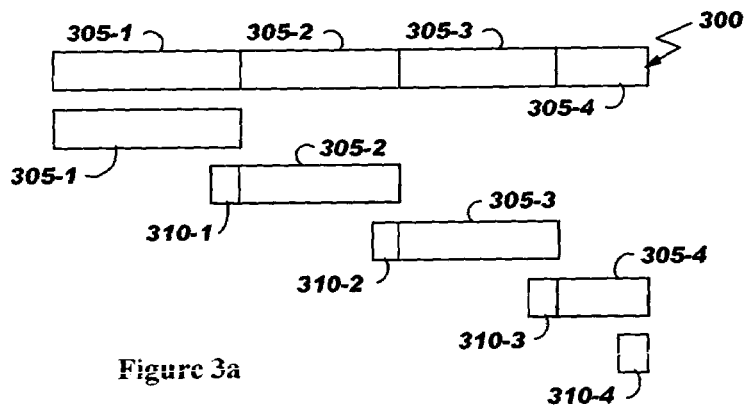
FIGS. 3*a* and 3*b*, shows how CRC bits are computed and how frames are organized.

Since the aim of the method of the invention is to analyze received data in real time and data used to test the system may be processed before the test, a standard Cyclic Redundancy Check (CRC) algorithm is used to determine CRC bits for each data to be transmitted so that receivers 210-1 to 210-s may detect transmission errors on the fly. Depending upon the length of the data and the maximal size of a frame that could be send on the data bus, the data is divided into blocks, i.e. the data is divided into blocks if the amount of data to send is bigger than the frame capacity, which is generally the case. FIG. 3a illustrates the common solution used to evaluate CRC bits when data 300 is transmitted by blocks. A first block 305-1 on which CRC bits can be evaluated is extracted from data 300 and CRC bits 310-1 are computed. Then, a second block 305-2 is extracted from data 300 and combined with CRC bits 310-1 to compute CRC bits 310-2. These operations are repeated with extracted blocks 305-3 and 305-4 to determine CRC bits 310-3 and final CRC bits 310-4 that have to be transmitted with data 300 to check its integrity. In the detailed description, CRC bits are determined for the data, ignoring the value of connection identifier. However, any data that do not change during the transmission, e.g. payload data and VCId, can be processed with the data to determine CRC bits.

Figure 3B:
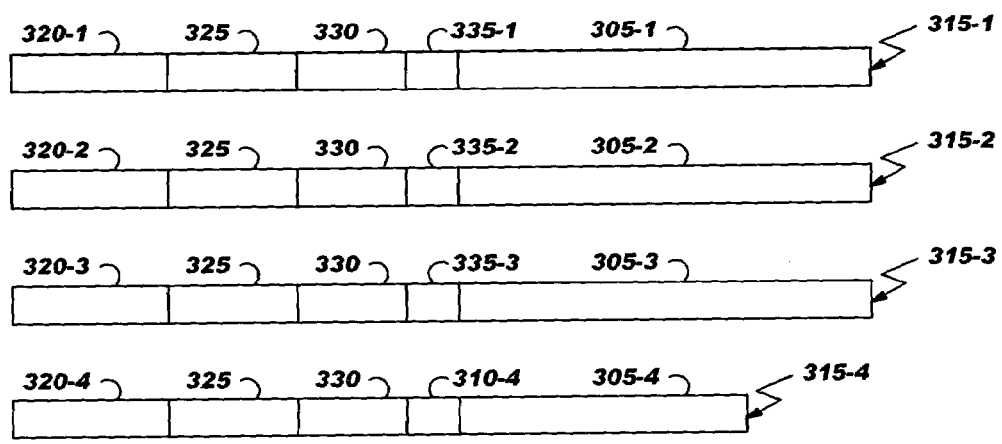

After having evaluate CRC bits 310-4 of data 300, frames to be transmitted through communication system 200 are organized as illustrated on FIG. 3b. Since data 300 has been divided into four blocks, four frames 315-1 to 315-4 are created. Each frame 315-1 to 315-4 comprises a first field, referred to as 320-1 to 320-4, respectively, that represents the standard frame header. The second and third fields 325 and 330 of frames 315-1 to 315-4 contain the address of the receiver to which the data has to be transmitted and the connection identifier value associated to data 300, respectively. Second and third fields 325 and 330 have the same values in the four frames 315-1 to 315-4 since each of them contain a part of the data 300. The destination address contains in the frames is used by the communication system to determine the right receiver. Frame 315-4 comprises a field that its content represents CRC bit values 310-4 and a flag to indicate that the frame contains CRC bits. Corresponding fields 335-1 to 335-3 of frames 315-1 to 315-3 may contain relevant information or not. In the preferred embodiment, these fields contain a value representing the frame order, i.e. field 335-1 contains value 1, field 335-2 contains value 2 and field 335-3 contains value 3, and a flag indicating that frames do not contain CRC bits. Finally, frames 315-1 to 315-4 contain a data field corresponding to blocks 305-1 to 305-4 respectively. It is to be understood that header and data fields are not required for using the method of the invention when CRC bits are evaluated on other fields, e.g. the value of connection identifier. It is also to be noticed that frame lengths can be different, e.g. the size of the last frame may be different than the others, depending upon the length of the data and the used transmission protocol.

Frames are formatted in a piece of software analyzing data that have to be transmitted and associated addresses to evaluate connection identifiers, their values and the CRC bits. This piece of software, referred to as supervisor as illustrated by box 225 on FIG. 2, is also used to make statistics and/or reports on errors decoded and sent by the receiver. Each receiver analyzes received data to control data integrity, e.g. data corruption, duplication or loss.

Figure 4B:
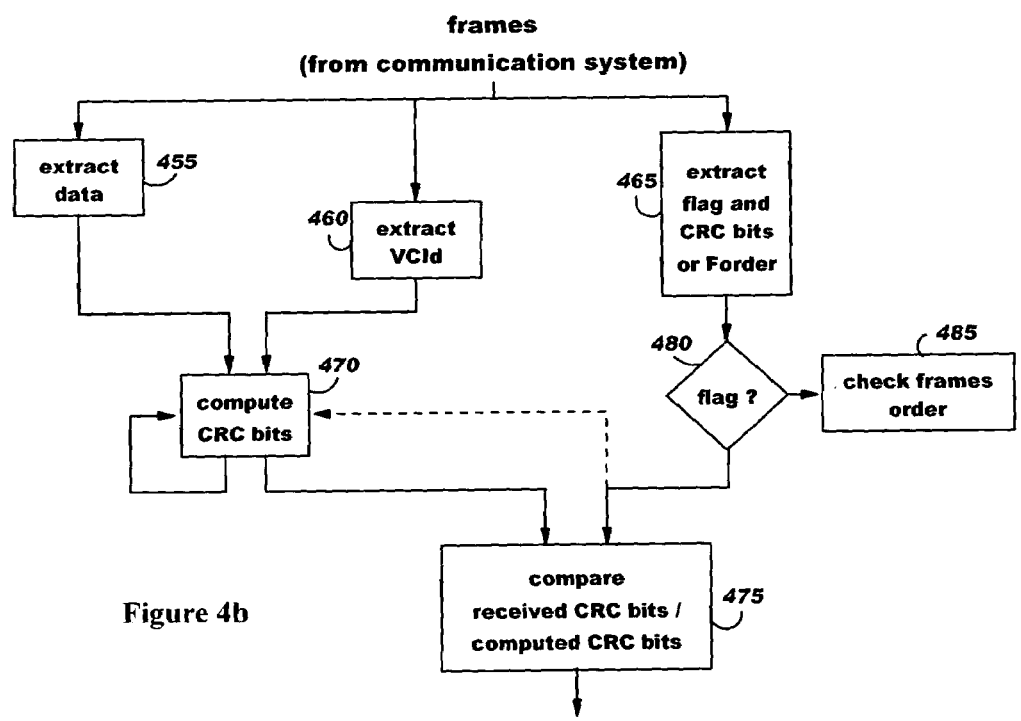
FIGS. 4a and 4b, illustrates an algorithm example of the method of the invention, to process data that is to be transmitted and to analyze received data.
Figure 4A:
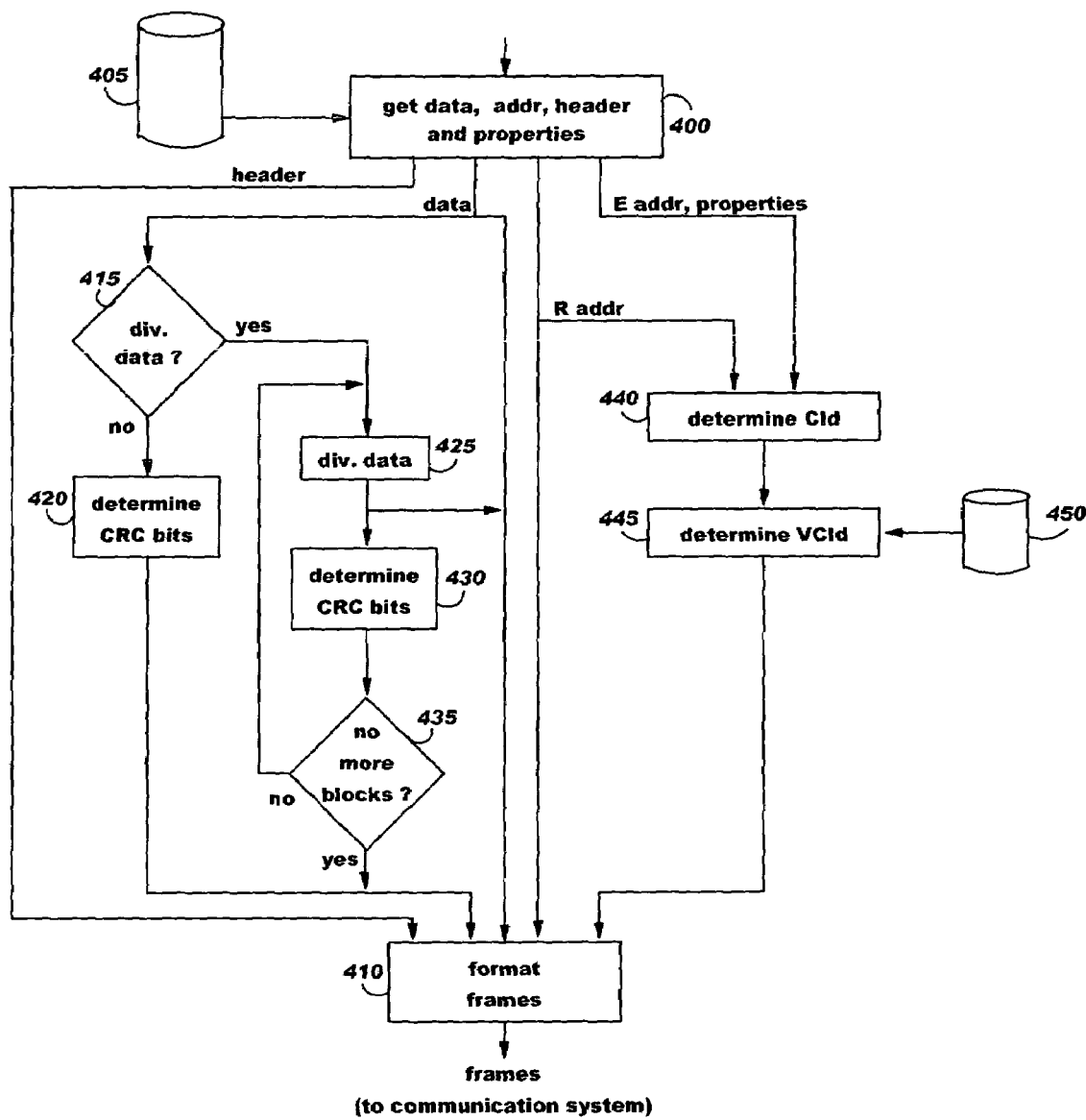

FIG. 4, comprising FIGS. 4a and 4b, describes an example of an algorithm implemented in the supervisor software, illustrating the method of the invention. FIG. 4a depicts the algorithm used to process data that have to be send to the communication system and FIG. 4b shows the algorithm used to analyze received data.

Turning now to FIG. 4a, the first step (box 400) of the algorithm used to process data for creating frames that are sent to the communication system consists in getting data and relevant associated information from a file 405 or another communication system. As discussed before, relevant information must comprise at least the destination addresses of the data. Information that is not requested for using the method, e.g. the header, may be transmitted directly, with the receiver address, to the last box 410 wherein frames are formatted. As described above, a first test (box 415) is performed to determine whether or not the size of the data to be transmitted is bigger than the frame capacity. The data to be transmitted considered in this description illustration comprises all the data of one connection. This means that all the data sent from one emitter to a receiver with specific properties are processed to obtain one final CRC, even if data of these frames are not sent following each others. The same order must be preserved to be sure that the decoding is done correctly. If the data size is less than the frame capacity, CRC bits are computed (box 420) and transmitted to last box 410. Else, if the data size is bigger than the frame capacity, the data is divided into blocks and the first block is selected (box 425) to compute CRC bits (box 430) as described above. Then, a test is performed to determine whether or not the selected block is the last one (box 435). If the selected block is not the last one, the following block is selected and the last three steps are repeated. When the last block is selected, the corresponding CRC bits and a flag set to a first value are transmitted to the last box 410 else, the number of the block and the flag set to a second value are transmitted to the last box 410. It is to be noticed that boxes 420 and 430 are drawn separately to simplify the description of the CRC process on fixed and variable block length and thus, they may be replaced by a single one. In the same time (or sequentially if the supervisor does not handle parallel tasks), the connection identifier CId is determined (box 440) using the emitter and receiver addresses and the properties that may comprise data priority as mentioned above. The value of the connection identifier VCId is then determined (box 445) using reference table 450. After having received the header, receiver address, value of connection identifier VCId, CRC bits or block number and associated flag and data, the frame is formatted in box 410 so that it could be transferred to the communication system. As mentioned above, header and data are not requested to use the method of the invention. It is to be understood that data formatting depends upon the communication system protocol that is independent of the method of the invention.

Received data are analyzed by an algorithm as the one presented on FIG. 4b. When frame are received, data, VCId and CRC bits or frame number (referred to as FOrder) with associated flag are extracted in boxes 455, 460 and 465, respectively. Extracted data and corresponding VCId are transmitted to box 470 to extract CRC bits that are either stored in a memory associated to VCId or transmitted to box 475 depending upon the flag value. If the flag value indicates that frame does not contain final CRC bits, evaluated CRC bits are stored so as to be used to determined final CRC bits using the same algorithm as the one described by reference to FIG. 3a. A test is performed in box 480 to determine whether or not the received frame contains final CRC bits or a frame number. If the frame contains a frame number, a test is performed in box 485 to check the frame order and to determine that frames have not been lost, duplicated, or swapped, i.e. to compare the frame number with the one of the previous frame having the same VCId. Else, if the frame contains final CRC bits, these transmitted CRC bits are compared in box 475 with the ones computed in box 470 to determine whether or not the data has been transmitted correctly, i.e. if CRC bits are the same.

Figure 5:
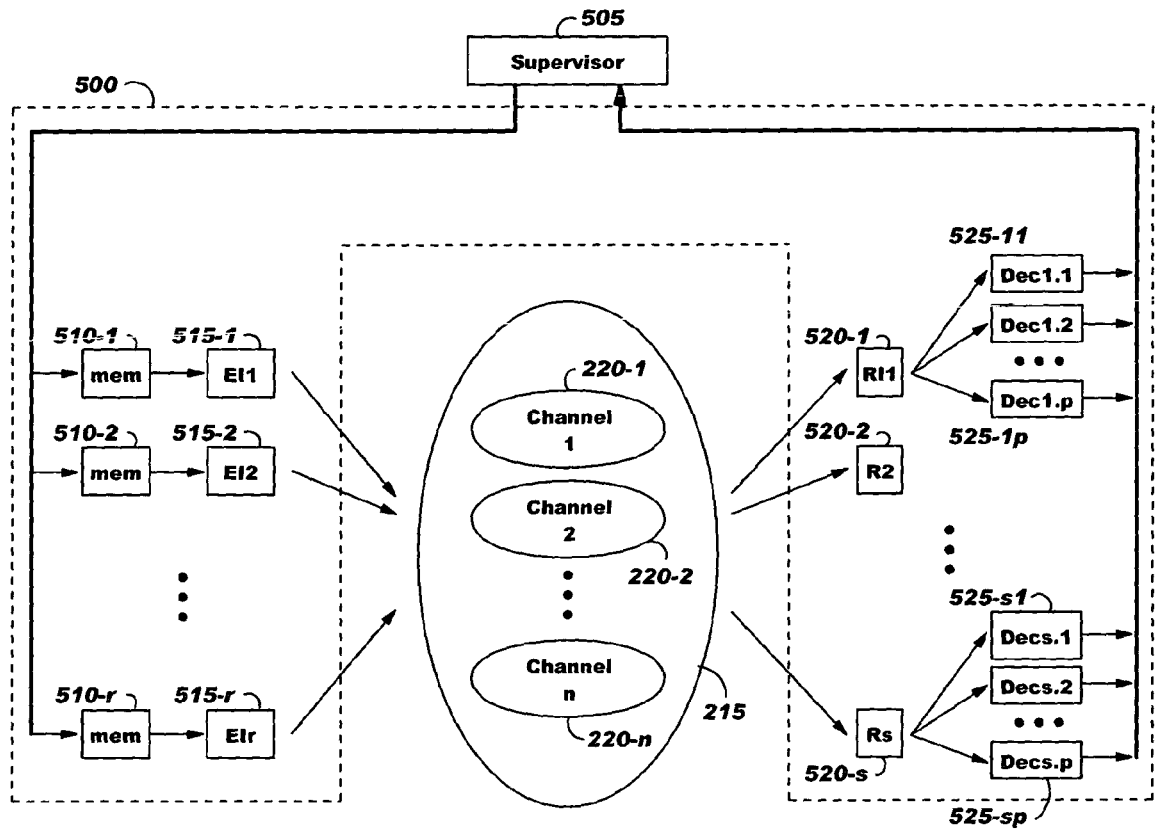
FIG. 5 describes an implementation example of the method of the invention.

In a preferred embodiment, the communication system test is based on the use of a dedicated hardware that interfaces a supervisor software as the one described above and the communication system 215 to be tested, as depicted on FIG. 5. Such dedicated hardware, referred to as traffic manager card(s) 500, interfacing communication system 215 and supervisor software 505, comprises emitting and receiving interfaces. Emitting interface includes a memory interface 510-1 and an emitting interface 515-1 per emitter of the communication system 215. Likewise a receiving interface 520-1 and CRC decoders 525-11 to 525-1*p* are associated to each receivers of the communication system 215.

Frames formatted by supervisor software 505 are queued in memory 510-1 according to the emitter identification associated to the frames before being transmitted to the communication system 215 through emitter interface 515-1. Frames stored in memory 510-1 are transmitted to emitter interface 515-1 according to arrival order, i.e. using a first-in-first-out scheme. Frames are transmitted from emitter interface 515-1 to receiver interface 520-1 through communication system 215. Communication system 215 determines the channel that has to be used, and analyzes the received frames to determine the receiver interface 520-1 to which the frame has to be send. When the frame is received at receiver interface 520-1, the VCId is extracted to determine the corresponding CRC decoder 525-11. CRC decoder 525-11 computes CRC bits and checks the frame and the whole data according to the algorithm explained above by reference to FIG. 4b.

Thus, the user builds a kind of scenario containing several frames to send in a given order from an emitter E to a receiver R. For sake of illustration, let us assume that the applied property P corresponds to a priority that scrambles the arrival order of the frames. For each emitter, the supervisor takes one frame after another, keeping the order, and determines whether or not the triple (E, R, P) has already been transmitted once by the same emitter. If not, the supervisor reserves a VCId for this triple in the reference table, otherwise the supervisor uses the VCId that has already been assigned to this triple. To handle multicast frame, a same VCId may be assigned to triples having a common emitter and different receivers so that the emitter transmit one frame comprising one address to several receivers. In such a case, the address corresponds to several receiver addresses and the frame is dispatched in the channel, not by the emitter. Since, there is only one transmission, the frame comprises only one VCId and one CRC. Thus, the process, that may be performed before the test, is the same for each data or block of data: the triple is determined, a VCId is attributed and the CRC is computed before formatting the data into a frame.

Figure 6:
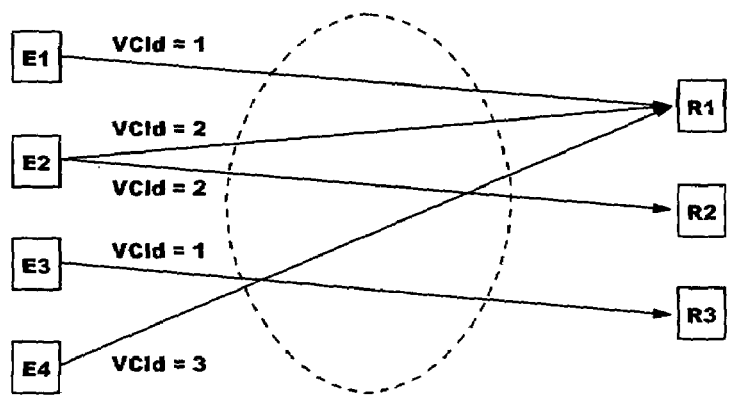
FIG. 6 shows an illustration of connection identifier value assignment.

FIG. 6 illustrates an example of VCId assignation. As shown, the VCId of a triple having an emitter E1 and a receiver R1 may be the same as the one having an emitter E3 and a receiver R3 since both emitters and receivers are different, for example, VCId=1. To handle multicast frames, a single VCId may be used for triples having a common emitter and different receivers, as shown with VCId=2 that characterize the triples having E2 as emitter and R1 and R2 as receivers. However, as depicted on FIG. 6 and mentioned above, triples having different emitters and a common receiver must have different VCId's. In the given example, the triple having E2 as emitter and R1 as receiver and the triple having E4 as emitter and R1 as receiver must have different VCId's, that are equal to 2 and 3, respectively.

Figure 7:
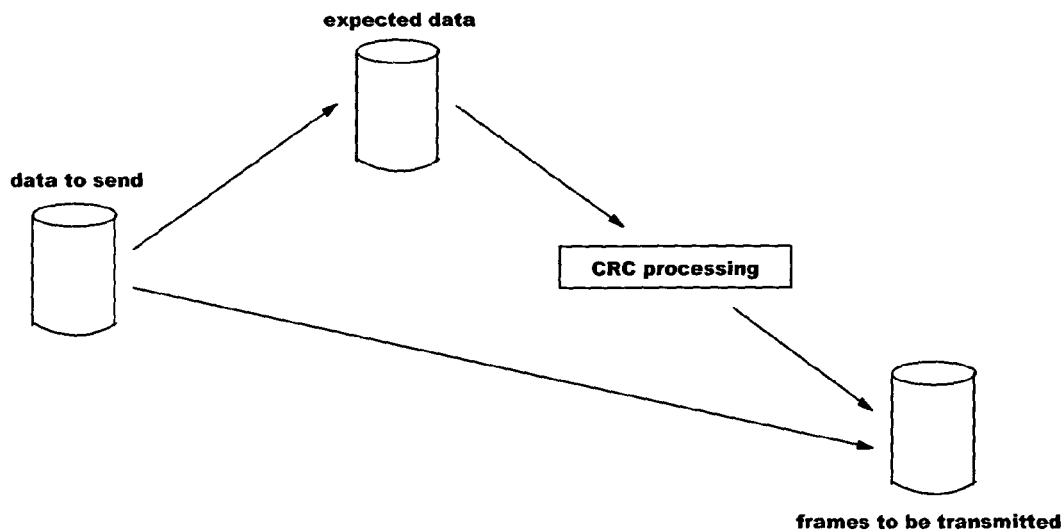
FIG. 7 illustrates an extension of the use of the method of the invention.

An immediate extension of the method of the invention concerns the test of communication systems wherein data are modified by an internal process. In such a case, since the supervisor knows exactly the process done by the communication system on the data sent to the channels (otherwise the communication system can not be tested), it is possible to determine, before transmitting anything, the data that should be received by the receiver. That means that even if all data are modified and scrambled, the expected data is always predictable and so, a CRC can always be processed on expected received data and sent with transmitted data. As a consequence, the process performed on the data by the communication system is apply on the data to obtain processed data on which CRC bits are computed. Then, CRC bits are associated to the data that has not been processed, before being sent to the communication system to test it as described above. FIG. 7 shows this principle.

Naturally, in order to satisfy local and specific requirements, a person skilled in the art may apply to the solution described above many modifications and alterations all of which, however, are included within the scope of protection of the invention as defined by the following claims.

The invention claimed is:

1. A method to test a communications system comprising a plurality of emitters, receivers and channels, with a set of data, each data comprising at least one emitter and receiver identifiers, said method comprising the steps of:

for each data in said set of data:
assigning a connection identifier value to said data according to the emitter and receiver identifiers of said data;
computing the CRC bits on said data;
associating said computed CRC bits and said connection identifier value with said data;
transmitting said data, said computed CRC bits and said connection identifier value to said communication system;
processing said transmitted data, computer CRC bits and connection identifier value in said communication system to pass on said data, said computed CRC bits and said connection identifier value to a corresponding receiver;
extracting data, CRC bits and connection identifier value;
computing CRC bits on said extracted data; and
comparing said extracted CRC bits and said CRC bits computed on said extracted data, wherein a transmission error is detected if said extracted CRC bits and said CRC bits computed on said extracted data are different.

2. The method of claim 1 wherein said step of associating said computed CRC bits and said connection identifier value to said data includes formatting a frame comprising said computer CRC bits, said connection identifier and said data.

3. The method of claim 1 wherein said step of computing CRC bits on said data comprises the steps of:
processing said data according to the process applied by said communication system on said transmitted data; and
computing CRC bits on said processed data.

4. The method of claim 1 wherein the steps of assigning a connection identifier value, computing CRC bits and assigning said computed CRC bits and said connection identifier value to said data, for each data of said set of data, are executed before testing of said communication system.

5. The method of claim 1 further comprising the steps of stopping the test of said communication system and forewarning the user when a transmission error is detected.

6. A computer readable medium comprising instructions which, when executing on a computer system, carry out the method according to claim 1.

* * * * *